United States Patent
Sare et al.

(10) Patent No.: US 7,758,688 B2
(45) Date of Patent: Jul. 20, 2010

(54) UNUSUALLY NARROW PARTICLE SIZE DISTRIBUTION CALCINED KAOLINS

(75) Inventors: Edward J. Sare, Macon, GA (US); Tommy Adkins, Cochran, GA (US)

(73) Assignee: Imerys Kaolin, Inc., Dry Branch, GA (US)

( * ) Notice: Subject to any disclaimer, the term of this patent is extended or adjusted under 35 U.S.C. 154(b) by 1267 days.

(21) Appl. No.: 10/518,791

(22) PCT Filed: Mar. 16, 2004

(86) PCT No.: PCT/US2004/007821

§ 371 (c)(1), (2), (4) Date: Aug. 21, 2005

(87) PCT Pub. No.: WO2004/085336

PCT Pub. Date: Oct. 7, 2004

(65) Prior Publication Data

US 2006/0118664 A1     Jun. 8, 2006

Related U.S. Application Data

(60) Provisional application No. 60/455,571, filed on Mar. 19, 2003.

(51) Int. Cl.
*C09C 1/42* (2006.01)
*C08K 3/36* (2006.01)
*B01J 21/16* (2006.01)
*D21H 19/40* (2006.01)

(52) U.S. Cl. ................. 106/468; 106/416; 106/484; 106/486; 502/80; 524/447; 162/181.8

(58) Field of Classification Search ............... 106/416, 106/468, 484, 486; 502/80; 524/447; 162/181.8
See application file for complete search history.

(56) References Cited

U.S. PATENT DOCUMENTS

| 5,393,340 | A | 2/1995 | Slepetys et al. |
| 6,136,086 | A | 10/2000 | Mathur et al. |
| 6,150,289 | A | 11/2000 | Chen et al. |
| 6,312,511 | B1 | 11/2001 | Bilimoria et al. |
| 6,402,826 | B1 | 6/2002 | Yuan et al. |
| 2002/0088376 | A1 * | 7/2002 | Sare et al. .......... 106/486 |

FOREIGN PATENT DOCUMENTS

EP    1 199 338 A    4/2002

* cited by examiner

*Primary Examiner*—David M Brunsman
(74) *Attorney, Agent, or Firm*—Finnegan, Henderson, Farabow, Garrett & Dunner, L.L.P.

(57) ABSTRACT

The present invention relates to a composition comprising calcined kaolin having a narrow particle size distribution. The composition can have many uses, such as fillers or extenders in paint, plastics, polymers, papermaking, and coating compositions. More generally, the inventive products may be used wherever calcined kaolins are used.

20 Claims, No Drawings

UNUSUALLY NARROW PARTICLE SIZE DISTRIBUTION CALCINED KAOLINS

This application is a 371 filing of PCT/US04/07281, filed Mar. 16, 2004.

This application claims the benefit of U.S. Provisional Application No. 60/455,571, entitled "Unusually Narrow Particle Size Distribution Calcined Kaolins," filed Mar. 19, 2003, which is hereby incorporated by reference in its entirety.

The present invention relates to a composition comprising calcined kaolin having a narrow particle size distribution. The composition can have many uses, such as fillers or extenders in paint, plastics, polymers, papermaking, and coating compositions. More generally, the inventive products may be used wherever calcined kaolins are used.

Particulate kaolins occur naturally in the hydrous form and exist as crystalline structures containing hydroxyl functionality. Particulate kaolins may be converted to a calcined form by thermal processes. Such processes cause the particulate kaolin to dehydroxylate. During calcination, the hydrous kaolin converts from a crystalline to an amorphous form. Further, during calcination, aggregation typically occurs.

Calcined kaolins can be used to improve the opacity of a pigment and find widespread use as pigments in paints, plastics, rubbers, sealants, and as raw materials for ceramics, cementitious products and other application compositions. For example, calcined kaolins can be used as flatting (or matting) agents in paints and coatings. They can help control the gloss and sheen of the surfaces of a final, dried paint film. Regarding optical paint film properties, they can impart opacity, whiteness, and other desirable properties. They can also serve as extenders by partial replacement of titanium dioxide and other more expensive pigments with minimal loss of whiteness or opacity.

Generally, the properties of both hydrous and calcined kaolin pigments are dependent on a number of pigment-related attributes, such as particle size (expressed in terms of particle size distribution, or PSD), shape, and texture of the individual particles and of agglomerates thereof. Typical calcined kaolins have a significantly broad particle size distribution. These kaolins are prepared from a hydrous feed, which has an even broader particle size distribution than that of the calcined kaolin.

There remains a need, however, for pigments capable of affording at least one of a number of improved physical properties, such as, for example, opacity, whiteness, and gloss/sheen control of a paint.

One aspect of the present invention provides a composition comprising calcined kaolin, the calcined kaolin having a particle size distribution wherein:

$$\frac{(\text{particle size at a cumulative mass of } <80\%)}{(\text{particle size at a cumulative mass of } <20\%)} \leq 3;$$

further wherein the calcined kaolin has a median particle size ranging from at least about 1 μm to about 3 μm, and a total of alkali and alkaline earth metals present in the composition is less than or equal to about 1.0% by weight, relative to the total weight of the composition.

Another aspect of the present invention provides a method of preparing a calcined kaolin comprising:
(a) providing a hydrous kaolin having a particle size distribution, wherein:

$$\frac{(\text{particle size at a cumulative mass of } <80\%)}{(\text{particle size at a cumulative mass of } <40\%)} \leq 3.5;$$

(b) heating the hydrous kaolin to at least one temperature ranging from about 500° C. to about 1200° C. for a time sufficient to at least partially dehydroxylate the hydrous kaolin; and
(c) forming a composition comprising calcined kaolin having a particle size distribution, wherein $$\frac{(\text{particle size at a cumulative mass of } <80\%)}{(\text{particle size at a cumulative mass of } <20\%)} \leq 3.$$

Another aspect of the present invention provides a composition comprising calcined kaolin, the calcined kaolin having a particle size distribution wherein:

$$\frac{(\text{particle size at a cumulative mass of } <80\%)}{(\text{particle size at a cumulative mass of } <20\%)} \leq 3; \text{ and}$$

further wherein the composition is formed from a hydrous kaolin obtained from the Rio Capim area of Brazil.

Another aspect of the present invention provides a method of preparing a calcined kaolin comprising:
(a) providing a hydrous kaolin having a particle size distribution, wherein:

$$\frac{(\text{particle size at a cumulative mass of } <80\%)}{(\text{particle size at a cumulative mass of } <40\%)} \leq 3.5; \text{ and}$$

(b) heating the hydrous kaolin to at least one temperature ranging from about 500° C. to about 1200° C. for a time sufficient to at least partially dehydroxylate the hydrous kaolin, and wherein the hydrous kaolin is obtained from the Rio Capim area of Brazil.

Another aspect of the present invention provides a composition comprising calcined kaolin, the calcined kaolin having a particle size distribution wherein:

$$\frac{(\text{particle size at a cumulative mass of } <80\%)}{(\text{particle size at a cumulative mass of } <20\%)} \leq 3;$$

further wherein a total of alkali and alkaline earth metals present in the composition is less than or equal to about 1.0% by weight, relative to the total weight of the composition, further wherein the calcined kaolin is formed from a hydrous kaolin; and the calcined kaolin is refined in the absence of a defining step.

Another aspect of the present invention provides a method of preparing a calcined kaolin comprising:
(a) providing a hydrous kaolin having a particle size distribution, wherein:

$$\frac{(\text{particle size at a cumulative mass of } <80\%)}{(\text{particle size at a cumulative mass of } <40\%)} \leq 3.5;$$

(b) heating the hydrous kaolin to at least one temperature ranging from about 500° C. to about 1200° C. for a time sufficient to at least partially dehydroxylate the hydrous kaolin; and (c) forming a composition comprising a calcined kaolin, wherein the composition is refined without a defining step.

Another aspect of the present invention provides a composition comprising calcined kaolin, the calcined kaolin having a particle size distribution wherein:

$$\frac{(\text{particle size at a cumulative mass of } <80\%)}{(\text{particle size at a cumulative mass of } <20\%)} \leq 3$$

further wherein the composition has a median particle size of at least about 1 μm, and the composition has an oil absorption of at least about 100%.

Generally, kaolins are used in coatings both as a filler and to lend opacity to the coating. Paint film opacity is related to light scattering, which occurs when light travels through two or more different materials, particularly where the different materials have refractive indices that differ significantly. In a composition comprising kaolin, light can be scattered by both the kaolin particles and cavities or voids. Thus, it is desired to achieve an arrangement of kaolin particles and voids or cavities in a matrix that maximizes light scattering by both the pigment and voids or cavities.

It is an unexpected discovery that calcined kaolin having a very narrow particle size distribution can result in an optimal arrangement of the kaolin particles and voids or cavities within a matrix, resulting in improved light scattering, and thereby, improved opacity.

Particle size distribution (psd) of particulate material is often characterized by a "steepness factor." Steepness is derived from the slope of a psd curve, where the particle diameter is plotted on the x-axis against a cumulative weight percentage of particles on the y-axis. A wide particle distribution has a low steepness value, whereas a narrow particle size distribution gives rise to a high steepness factor.

One aspect of the present invention relates to calcined kaolin having a narrow particle size distribution, i.e., a high steepness factor, as measured by a ratio of: (1) particle size at a cumulative mass of less than 80% of the particles, to (2) particle size at a cumulative mass of less than 20% of the particles, as determined by Sedigraph 5100. Specifically, the particle size distribution is characterized by the following equation:

$$\frac{(\text{particle size at a cumulative mass of } <80\%)}{(\text{particle size at a cumulative mass of } <20\%)} \leq 3$$

This ratio is also termed the 80/20 Relative Particle Size Ratio (RPR).

Particle sizes, and other particle size properties referred to in the present application, are measured in a well-known manner by, e.g., sedimentation of the particulate material in a fully dispersed condition in an aqueous medium using a SEDIGRAPH 5100 instrument as supplied by Micromeritics Corporation. The size of a given particle is expressed in terms of the diameter of a sphere of equivalent diameter, which sediments through the suspension, i.e., an equivalent spherical diameter or esd. All particle size data measured and reported herein, including in the examples, were taken in a known manner, with measurements made in water at the standard temperature of 34.9° C. All percentages and amounts expressed herein are by weight. All amounts, percentages, and ranges expressed herein are approximate.

In one aspect, the calcined kaolin composition has a median particle size, via Sedigraph 5100, of at least about 1 μm. In another aspect, the calcined kaolin composition has a median particle size ranging from at least about 1 μm to about 3 μm.

"Calcined kaolin" as used herein refers to a kaolin that has been converted from the corresponding (naturally occurring) hydrous kaolin to the dehydroxylated form by thermal methods. Calcination changes, among other properties, the kaolin structure from crystalline to amorphous. Calcination is effected by heat-treating coarse or fine hydrous kaolin in any known manner, e.g., at temperatures ranging from 500° C. to 1200° C., such as temperatures ranging from 800° C. to 1200° C.

The degree to which hydrous kaolin undergoes changes in crystalline form can depend upon the amount of heat to which the hydrous kaolin is subjected. Initially, dehydroxylation of the hydrous kaolin can occur upon exposure to heat. At temperatures below a maximum of about 850-900° C., the product is often considered to be virtually dehydroxylated, with the resultant amorphous structure commonly referred to as a metakaolin. Frequently, calcination at this temperature is referred to as "partial calcination," and the product may also be referred to as "partially calcined kaolin." Further heating to temperatures above about 900-950° C. can result in further structural changes, such as densification. Calcination at these higher temperatures is commonly referred to as "full calcination," and the product is commonly referred to as 'fully calcined kaolin'.

Additional calcination may cause formation of mullite. Mullite concentrations ranging from about 2% to about 3% by weight, relative to the total weight of the composition according to the invention may be useful in some end-use applications, such as ceramic catalyst substrates, e.g., cordierite substrates. In other aspects, mullite may be present in the composition in an amount ranging from greater than about 2%, greater than about 5%, or greater than about 8%, by weight relative to the total weight of the composition, such that they may also be useful in some end-use applications.

Accordingly, "calcined" (or "calcination"), as used in herein, may encompass any degree of calcination, including partial (meta) and/or full and/or flash calcination.

Effective calcining procedures include, but are not limited to, soak calcining and flash calcining. In soak calcining, a hydrous kaolin is heat treated at temperatures ranging from 500° C. to 1200° C., such as temperatures ranging from 800° C. to 1200° C., from 850-900° C., or from 900-950° C., as described herein, for a period of time (e.g., from at least 1 minute to 5 or more hours) sufficient to dehydroxylate the kaolin. In flash calcining, a hydrous kaolin is heated rapidly for a period of less than 1 second, typically less than 0.5 second.

The furnace, kiln, or other heating apparatus used to effect calcining of the hydrous kaolin may be of any known kind. Known devices suitable for carrying out soak calcining include high temperature ovens and rotary and vertical kilns. Known devices for effecting flash calcining include toroidal fluid flow heating devices, such as those described in WO 99/24360, the disclosure of which is incorporated by reference herein.

It had been previously proposed that a calcined kaolin having a narrow particle size distribution can be prepared by hydrous kaolins having alkali metal- and/or alkaline earth-metal compounds. These metal compounds can either be naturally present in the hydrous kaolin or added to the hydrous kaolin prior to calcining to promote a process termed "fluxing" (see, e.g., U.S. Pat. No. 6,136,086). Fluxing involves adding fluxing agents, such as alkali and alkaline earth metal compounds, to cause strong, permanent bonding of the kaolin. As a result of the fluxing process, however, the alkali or alkaline earth metals remain present in the calcined kaolin product and may act as detrimental impurities in some applications.

Accordingly, another aspect of the present invention provides a calcined kaolin composition having a narrow particle size distribution, and which is substantially free of alkali metal and alkaline earth metal compounds. The present invention avoids the addition of alkali metal or alkaline earth metal compounds prior to calcination, resulting in a calcined kaolin product of higher purity. In one aspect, "substantially free of alkali metal or alkaline earth metal compounds" refers to calcined kaolin having alkali and alkaline earth metals present in an amount of less than about 1% by weight relative to the total weight of the composition, i.e., the total of alkali and alkaline earth metals present in the composition is no more than about 1.0% by weight, relative to the total weight of the composition. In another aspect, the total of alkali and alkaline earth metals present in the composition is no more than about 0.75% by weight, such as no more than about 0.6%, no more than 0.5%, or no more than about 0.25% by weight relative to the total weight of the composition.

In one aspect, the calcined kaolin has optimal oil absorption properties. Oil absorption refers to the number of grams of oil absorbed by 100 grams of the pigment (units of g/g, indicated as a %) and is an indication of the total porosity of the pigment. Oil absorption is dependent on particle structure, and particle size. Higher oil absorption leads to increased opacity. In one aspect, the calcined kaolin has an oil absorption of at least about 100%, such as an oil absorption of at least about 110%.

Another aspect of the present invention provides a method of preparing calcined kaolin having a narrow particle size distribution. The method comprises:

(a) providing a hydrous kaolin having a particle size distribution, wherein:

$$\frac{\text{(particle size at a cumulative mass of <80\%)}}{\text{(particle size at a cumulative mass of <40\%)}} \leq 3.5; \text{ and}$$

(b) heating the hydrous kaolin to at least one temperature ranging from about 500° C. to about 1200° C. for a time sufficient to at least partially dehydroxylate the hydrous kaolin.

The ratio in (a) is also termed the 80/40 Relative Particle Size Ratio (RPR). Thus, in (a), the hydrous kaolin is selected to have a relatively narrow psd. In one aspect, the hydrous kaolin in (a) has a median particle size ranging from at least about 0.5 µm to about 2 µm. The hydrous kaolin in (a) can be purchased commercially. Alternatively, the hydrous kaolin in (a) can be obtained by refining a naturally occurring kaolin, such as by centrifugation and/or defining. Exemplary naturally occurring kaolins include those obtained from the U.S., e.g., Georgia, Brazil, such as from the Rio Capim area, Australia, and the United Kingdom.

In one aspect, the hydrous kaolin is platy, having a shape factor of at least about 10, such as a shape factor of at least about 20.

Prior to (b), the kaolin can be subjected to one or more well known beneficiation steps to remove undesirable impurities. For example, the aqueous suspension of kaolin clay may be subjected to a froth flotation treatment operation to remove titanium containing impurities in the froth. In a more specific example, the slurry can be conditioned with an oleic acid to coat the air bubbles produced in the float cells. The titania minerals adhere to the air bubbles and are floated out of the kaolin slurry. An example of such a flotation process is described in U.S. Pat. No. 3,450,257, to Cundy, which is herein incorporated by reference. This process can result in an improved brightness in the kaolin pigment, i.e., a brightness gain ranging from about 0.1 to about 3 units.

Alternatively, or in addition, the kaolin may be passed as a suspension through a high intensity magnetic separator to remove iron containing impurities, prior to (b). A standard high intensity wet magnetic separator can be used. This process can also result in a brightness gain ranging from about 0.1 to about 3.0 units.

Also optionally, the kaolin can be subjected to a selective flocculation process prior to (b) in which the impurities are flocced out of suspension while the kaolin clay remains in suspension. In one example, a high molecular weight anionic polymer having a molecular weight in excess of one million, or a molecular weight in the range of about 10 to about 15 million can be used. The anionic polymer can be a copolymer of a polyacrylamide or polyampholyte. The refined clay slurry may be ozoned, leached (bleached), and/or filtered. The clay may then be acid flocculated and dried, or may be redispersed in a makedown tank and alternately spray dried. Details of a particular selective flocculation process can be found in U.S. Pat. No. 4,227,920, to Chapman and Anderson. U.S. Pat. No. 5,685,900 to Yuan et al., which includes ozonation.

Heating the hydrous kaolin in (b) refers to any of the calcination processes discussed above. Heating to at least one temperature can comprise heating the hydrous kaolin at one temperature only, at two or more different temperatures, or over a range of temperatures. The heating can occur for a time to partially or fully calcine the hydrous kaolin depending on the heating time and temperature. For example, in one aspect, the heating in (b) is carried out for a sufficient a time to partially calcine the hydrous kaolin. In another aspect, the heating in (b) is carried out for a sufficient time to fully calcine the hydrous kaolin.

The calcined kaolin composition of the present invention can be used for a variety of applications wherein increased opacity, whiteness or sheen/gloss control are desired. For example, the calcined kaolin-products of the invention can be used in coating compositions in which any one of these characteristics are desired. Products of the invention may also be useful wherever kaolins are used, such as in making filled plastics, rubbers, sealants, and cables, or they may be used in the manufacture of ceramic products, cementitious products, and paper products and paper coatings.

The present invention can be used in the production of all paper grades, from ultra lightweight coated paper to coated or filled board. Paper and paperboard products can comprise a coating, which can improve the brightness and opacity of the finished paper or board.

The inventive products can also serve as extenders, allowing the partial replacement of expensive titanium dioxide pigments without unacceptable loss of opacity or tint strength. The extender material can be used in paper, polymers, paints and the like or as a coating pigment or color ingredient for coating of paper, paper board, plastic, papers and the like.

Thus, one aspect of the present invention provides a method of making a coated paper or coated paper board. The method comprises coating a fibrous substrate with calcined kaolin having a particle size distribution, wherein:

$$\frac{\text{(particle size at a cumulative mass of <80\%)}}{\text{(particle size at a cumulative mass of <20\%)}} \leq 3$$

Other aspects of the present invention include a coating for paper or paper board, or a paint comprising calcined kaolin having a particle size distribution as described above.

Paint compositions comprising calcined kaolin and optionally at least one ingredient chosen from thickeners, dispersants, and biocides, as described herein, may additionally comprise at least one additional ingredient chosen from a polymeric binder, a primary pigment such as titanium dioxide, a secondary pigment such as calcium carbonate, silica, nephaline syenite, feldspar, dolomite, diatomaceous earth, and flux-calcined diatomaceous earth. For water-based versions of such paint compositions, any water-dispersible binder, such as polyvinyl alcohol (PVA) and acrylics may be used. Paint compositions of the present invention may also comprise other conventional additives, including, but not limited to, surfactants, thickeners, defoamers, wetting agents, dispersants, solvents, and coalescents.

Paper coatings according to the present invention can include, in addition to the calcined kaolin as described above, materials generally used in the production of paper coatings and paper fillers. The compositions can include a binder and a pigment, such as $TiO_2$. The coatings according to the present invention may optionally include other additives, including, but not limited to, dispersants, cross linkers, water retention aids, viscosity modifiers or thickeners, lubricity or calendering aids, antifoamers/defoamers, gloss-ink hold-out additives, dry or wet rub improvement or abrasion resistance additives, dry or wet pick improvement additives, optical brightening agents or fluorescent whitening agents, dyes, biocides, leveling or evening aids, grease or oil resistance additives, water resistance additives and/or insolubilizers.

Any art recognized binder may be used in the present invention. Exemplary binders include, but are not limited to, adhesives derived from natural starch obtained from a known plant source, for example, wheat, corn, potato or tapioca; and synthetic binders, including styrene butadiene, acrylic latex, vinyl acetate latex, or styrene acrylic, casein, polyvinyl alcohol, polyvinyl acetate, or mixtures thereof.

Paper coatings have very different binder levels depending upon the type of printing to be used with the coated paper product. Appropriate binder levels based upon the desired end product would be readily apparent to the skilled artisan. Binder levels are controlled to allow the surfaces to receive ink without disruption. The latex binder levels for paper coatings generally range from about 3% to about 30%. In one aspect according to the present invention, the binder is present in the paper coating in an amount of from about 3% to about 10%. In another aspect according to the present invention, the binder is present in the coating in an amount ranging from about 10% to about 30% by weight.

In another aspect, the present invention provides a polymer comprising the calcined kaolin composition as described herein. In another aspect, the present invention comprises a polymeric sheathing for a wire or cable comprising the calcined kaolin composition as described herein. In another aspect, the present invention provides a rubber composition comprising the calcined kaolin composition described herein.

Another aspect of the present invention provides a calcined kaolin having a narrow psd for use in catalyst applications, such as automotive catalytic converters or in catalytic cracking applications. In automotive catalyst converters, calcined kaolin can be used as a support structure for a thin layer of a metallic catalyst such as platinum or palladium. Thus, one aspect the invention provides a composition for an automotive catalyst support comprising a calcined kaolin as described above. Calcined kaolins have also been used in the manufacture of zeolites for catalytic cracking applications, either as the catalyst or in conjunction with catalysts. Thus, another aspect of the present invention provides a composition for catalytic cracking comprising a calcined kaolin as described above.

In one aspect, the present invention provides a feed for a ceramic, wherein the feed comprises the calcined kaolin as described herein. The ceramic can be used for supporting a catalyst, e.g., such as a catalyst used in a catalytic converter. In another aspect, the ceramic comprises the catalyst.

The invention will be further clarified by the following non-limiting examples, which are intended to be purely exemplary of the invention.

EXAMPLES

In these Examples, the particle sizes were determined by a Sedigraph 5100.

Example 1

The particle size distribution of calcined hydrous kaolins are shown in Table I below. In this Example, the particle size distribution of calcined kaolin prepared from hydrous kaolins A and B was compared with that of a conventional calcined kaolin. Hydrous Kaolins A and B were selected to have a narrow particle size range such that the resulting 80/40 relative particle size ratio (RPR) was less than 3.5. In contrast, the 80/40 RPR of the feed for the conventional calcined kaolin was 6.0, a value well above 3.5.

The hydrous kaolins A and B and the feed for the commercially available calcined kaolin were calcined at 1050° C. until fully calcined. Table I also lists the particle size distribution of the calcined kaolin obtained. The 80/20 RPR of the conventional calcined kaolin falls far above 3.0. In contrast, Inventive Calcined A and B provided a narrow particle size distribution with a 80/20 RPR of 2.9 and 2.4, respectively.

TABLE I

|  | Hydrous A | Hydrous B | Conventional Calcined - Hydrous Feed |
|---|---|---|---|
| % < 3 μm | 91 | 96 | 81 |
| % < 2 μm | 81 | 90 | 72 |
| % < 1 μm | 57 | 71 | 59 |
| % < 0.5 μm | 32 | 43 | 41 |
| Median | 0.8 | 0.6 | 0.7 |
| 80/40 RPR[1] | 3.2 | 2.8 | 6.0 |

|  | Inventive Calcined A | Inventive Calcined B | Conventional Calcined |
|---|---|---|---|
| % < 5 μm | 98 | 99 | 89 |
| % < 2 μm | 68 | 84 | 64 |
| % < 1 μm | 19 | 30 | 40 |
| % < 0.5 μm | 1 | 1 | 7 |
| Median | 1.6 | 1.1 | 1.2 |
| 80/20 RPR[2] | 2.9 | 2.4 | 4.3 |

[1] 80/40 RPR = Relative Particle Size Ratio = $\dfrac{\text{(particle size at a cumulative mass of <80\%)}}{\text{(particle size at a cumulative mass of <40\%)}}$

[2] 80/20 RPR = Relative Particle Size Ratio = $\dfrac{\text{(particle size at a cumulative mass of <80\%)}}{\text{(particle size at a cumulative mass of <20\%)}}$

Example 2

In this Example, the particle size distribution of a calcined kaolin prepared from hydrous kaolin containing alkali and alkaline earth metal compounds was compared with the Inventive Calcined A and B from Example 1. Table II lists the particle size distribution of the hydrous and calcined kaolins for samples A and B of Example 1, and the alkali-metal containing kaolin of this example.

TABLE II

|  | Inventive Hydrous A | Inventive Hydrous B | Alkali, Metal-Containing Hydrous |
|---|---|---|---|
| % < 3 μm | 91 | 96 | 88 |
| % < 2 μm | 81 | 90 | 78 |
| % < 1 μm | 57 | 71 | 62 |
| % < 0.5 μm | 32 | 43 | 40 |
| Median | 0.8 | 0.6 | 0.7 |
| 80/40 RPR[1] | 3.2 | 2.8 | 3.7 |

|  | Inventive Calcined A | Inventive Calcined B | Alkali, Metal-Containing Calcined |
|---|---|---|---|
| % < 5 μm | 98 | 99 | 78 |
| % < 2 μm | 68 | 84 | 38 |
| % < 1 μm | 19 | 30 | 9 |
| % < 0.5 μm | 1 | 1 | <1 |
| Median | 1.6 | 1.1 | 2.6 |
| 80/20 RPR[2] | 2.9 | 2.4 | 3.6 |

[1] 80/40 RPR = Relative Particle Size Ratio = $\frac{\text{(particle size at a cumulative mass of <80\%)}}{\text{(particle size at a cumulative mass of <40\%)}}$

[2] 80/20 RPR = Relative Particle Size Ratio = $\frac{\text{(particle size at a cumulative mass of <80\%)}}{\text{(particle size at a cumulative mass of <20\%)}}$ The alkali-metal containing hydrous sample had a 80/40 RPR just above 3.5. Fully calcining the hydrous kaolin at 1050° C., however, did not cause the 80/20 RPR to fall below 3.0. In contrast, the Inventive Calcined A and B samples achieved a very narrow particle size distribution, as evidenced by a 80/20 RPR below 3, without requiring the step of adding any alkali metal impurities to the starting hydrous kaolin. Thus, the resulting calcined kaolin product had a higher purity than those obtained by fluxing. Table III lists the amount of metal impurities present in the calcined kaolin products of Inventive Calcined A and B, and the calcined kaolin prepared with fluxing.

TABLE III

|  | $Al_2O_3$ | $K_2O$ | MgO | $SiO_2$ | $Na_2O$ | $Fe_2O_3$ | $TiO_2$ | CaO | Total |
|---|---|---|---|---|---|---|---|---|---|
| Inventive A | 45.4 | <0.1 | <0.05 | 51.9 | <0.3 | <0.8 | 1.0 | <0.1 | 99.7 |
| Inventive B | 45.3 | <0.1 | <0.05 | 51.8 | <0.3 | <0.8 | <0.8 | <0.1 | 99.3 |
| Alkali Metal-Containing Calcined | 42.6 | 1.8 | 0.3 | 52.7 | <0.3 | <1.0 | <0.5 | <0.1 | 99.3 |

Inventive Calcined A and B contained alkali and alkaline earth metal impurities in an amount totaling less than 0.55%. In contrast, the alkali metal-containing calcined product had alkali and alkaline earth metal impurities of at least 2.1%.

Example 3

The physical properties of the calcined kaolin products of Example 1 are shown in Table IV below.

TABLE IV

|  | Inventive Calcined A | Inventive Calcined B | Commercial Conventional Calcined |
|---|---|---|---|
| GE Brightness | 94.0 | 94.7 | 92.1 |
| L | 97.4 | 97.9 | 96.7 |
| a | −0.6 | −0.5 | −0.4 |
| b | 2.0 | 1.9 | 3.1 |
| Median | 1.6 | 1.1 | 1.2 |
| Oil Absorption (%) | 101 | 114 | 67 |

The oil absorption was determined by the Spatula Rub-out Oil Absorption Test (ASTM D-281). Although the oil absorption of the Inventive Calcined A and B pigments was higher than that of the commercially available pigment.

44% PVC (Pigment Volume Concentration) formulations. containing the Inventive Calcined A and B samples and the commercial calcined kaolin were prepared, as shown in the formulation of Table V.

TABLE V

|  | lbs/100 Gallons of Paint |
|---|---|
| Water | 290.0 |
| KTPP (potassium tripolyphosphate) | 1.8 |
| Tamol ® 731 (nonionic polymeric dispersant) | 7.9 |
| Igepal CO-610 (nonylphenol ethoxylate) | 4.0 |
| Colloids 681F | 3.0 |
| Titanium Dioxide (R-706) | 102.3 |
| Commercial $CaCO_3$ | 72.2 |
| Calcined Kaolin | 199.5 |
| Natrosol 250HR (hydroxyethylcellulose) | 4.0 |
| Disperse to a 4 NS,[1] then add the following while slowly mixing | |
| Ucar 379 (vinyl/acrylic) | 338.6 |
| Ethylene Glycol | 24.8 |
| Texanol (ester alcohol) | 9.9 |
| Water | 45.7 |
| Weight Solids | 52.1% |
| Volume Solids | 36.7% |

[1] Hegman National Standard

Table VI summarizes the paint film properties of the 44% PVC formulation.

TABLE VI

|  | 44% PVC | | |
|---|---|---|---|
| Commercial Conventional Calcined | X | — | — |
| Inventive Calcined A | — | X | — |
| Inventive Calcined B | — | — | X |
| Commercial CaCO₃ (3 micron) | X | X | — |
| Commercial CaCO₃ (5 micron) | — | — | X |
| 60° Gloss[1] | 3.2 | 3.0 | 2.9 |
| 85° Sheen[1] | 4.0 | 4.0 | 3.1 |
| ASTM-E-313 White[2] | 80.7 | 83.4 | 83.3 |
| ASTM-E-313 Yellow[2] | 2.5 | 1.8 | 1.9 |
| Brightness[2] | 87.6 | 88.5 | 88.7 |
| $L^2$ | 94.6 | 94.8 | 94.9 |
| $a^2$ | −1.0 | −0.9 | −1.0 |
| $b^2$ | 1.8 | 1.4 | 1.5 |
| Contrast Ratio | 93.0 | 94.2 | 94.3 |

[1] Hunter Pro-3 Gloss Meter
[2] Hunter Ultrascan XE

Gloss and sheen were measured in a known manner using a Hunter Pro-3 Gloss Meter. ASTM-E-313 white and yellow are standard measurements, made using a Hunter Ultrascan XE Instrument, of the whiteness and yellowness of near white, opaque film coatings. Components a, b, and L are the color component values on the color space scale as measured by a Hunter Ultrascan XE instrument. "+a" is a measure of red tint; "−a" is a measure of green tint; "+b" is a measure of yellow tint; "−b" is a measure of blue tint; "L" is a measure of whiteness.

It can be seen from Table VI that the paint films obtained from formulations prepared from the inventive pigments provided comparable gloss, and comparable sheen to the pigment prepared from commercially available hydrous kaolin. Moreover, the inventive compositions provided improved whiteness, brightness, and contrast ratio.

Tinted films were made from the 44% PVC paint by adding the equivalent of 11 pounds by weight of phthalo blue dispersion to 100 gallons of paint. Table VII summarizes the properties of the tinted paint films from the 44% PVC formulations.

TABLE VII

|  | 44% PVC | | |
|---|---|---|---|
| Commercial Conventional Calcined | X | — | — |
| Inventive Calcined A | — | X | — |
| Inventive Calcined B | — | — | X |
| Commercial CaCO₃ (3 micron) | X | X | — |
| Commercial CaCO₃ (5 micron) | — | — | X |
| $L^2$ | 76.5 | 77.3 | 77.2 |
| $a^2$ | −12.3 | −11.9 | −11.9 |
| $b^2$ | −19.8 | −19.4 | −19.0 |
| Δ L | — | −0.8 | −0.7 |
| Δ a | — | −0.4 | −0.4 |
| Δ b | — | −0.4 | −0.8 |
| Δ E | — | 1.0 | 1.1 |

[1] 11 pounds Phthalo Blue dispersion per 100 gallons
[2] Hunter Ultrascan XE

The parameter ΔE is a measure of tint strength and is given by the expression: $\Delta E = (\Delta L^2 + \Delta a^2 + \Delta b^2)^{1/2}$. Again, the inventive compositions showed superior overall tint strength.

65% PVC formulations containing the Inventive Calcined A and B samples and the commercial calcined kaolin were prepared, as shown in the formulation of Table VIII.

TABLE VIII

|  | lbs/100 Gallons of Paint |
|---|---|
| Water | 339.9 |
| KTPP (potassium tripolyphosphate) | 1.8 |
| Tamol ® 731 (nonionic polymeric dispersant) | 7.8 |
| Igepal CO-610 (nonylphenol ethoxylate) | 3.9 |
| Colloids 681F | 2.9 |
| Titanium Dioxide (R-706) | 58.8 |
| Commercial CaCO₃ | 264.3 |
| Calcined Kaolin | 221.6 |
| Natrosol 250HR (hydroxyethylcellulose) | 3.9 |
| Disperse to a 4 NS,[1] then add the following while slowly mixing | |
| Ucar 379 (vinyl/acrylic) | 213.5 |
| Ethylene Glycol | 24.5 |
| Texanol (ester alcohol) | 9.8 |
| Water | 45.1 |
| Weight Solids | 56.5% |
| Volume Solids | 37.6% |

[1] Hegman National Standard

Table IX summarizes the paint film properties of the 65% PVC formulations.

TABLE IX

|  | 65% PVC | | |
|---|---|---|---|
| Commercial Conventional Calcined | X | — | — |
| Inventive Calcined A | — | X | — |
| Inventive Calcined B | — | — | X |
| Commercial CaCO₃ (3 micron) | X (50%) | X | — |
| Commercial CaCO₃ (5 micron) | X (50%) | — | X |
| 60° Gloss[1] | 2.9 | 3.0 | 3.0 |
| 85° Sheen[1] | 3.4 | 3.3 | 3.6 |
| ASTM-E-313 White[2] | 80.3 | 82.3 | 82.9 |
| ASTM-E-313 Yellow[2] | 2.6 | 2.2 | 2.1 |
| Brightness | 87.6 | 88.5 | 88.9 |
| $L^2$ | 94.7 | 95.0 | 95.2 |
| $a^2$ | −0.8 | −0.8 | −0.8 |
| $b^2$ | 1.9 | 1.6 | 1.6 |
| Contrast Ratio | 95.4 | 95.6 | 95.6 |

[1] Hunter Pro-3 Gloss Meter
[2] Hunter Ultrascan XE

Paint films made using the inventive compositions provided comparable gloss and sheen, and exhibited superior whiteness and brightness properties compared to the paint prepared form the commercially available calcined kaolin.

Table X summarizes the properties of tinted films from the 65% PVC formulations.

TABLE X

|  | 65% PVC | | |
|---|---|---|---|
| Commercial Conventional Calcined | X | — | — |
| Inventive Calcined A | — | X | — |
| Inventive Calcined B | — | — | X |
| Commercial CaCO₃ (3 micron) | X (50%) | X | — |
| Commercial CaCO₃ (5 micron) | X (50%) | — | X |
| $L^2$ | 76.7 | 77.4 | 77.5 |
| $a^2$ | −12.2 | −11.9 | −11.8 |
| $b^2$ | −19.2 | −19.0 | −19.1 |
| Δ L | — | −0.7 | −0.8 |
| Δ a | — | −0.3 | −0.4 |
| Δ b | — | −0.2 | −0.1 |
| Δ E | — | 0.8 | 0.8 |

[1] 11 pounds Phthalo Blue dispersion per 100 gallons
[2] Hunter Ultrascan XE

Again, the inventive compositions provided superior tint strength properties in a 65% PVC paint compared to the commercial conventional calcined product.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention.

What is claimed is:

1. A composition comprising calcined kaolin, the calcined kaolin having a particle size distribution wherein:

$$\frac{(\text{particle size at a cumulative mass of } <80\%)}{(\text{particle size at a cumulative mass of } <20\%)} \leq 3;$$

further wherein the calcined kaolin has a median particle size ranging from at least about 1 μm to about 3 μm; and the total of alkali and alkaline earth metals present in the composition is less than or equal to about 0.6% by weight, relative to the total weight of the composition.

2. The composition according to claim 1, wherein the calcined kaolin is produced from a hydrous kaolin having a particle size distribution, wherein:

$$\frac{(\text{particle size at a cumulative mass of } <80\%)}{(\text{particle size at a cumulative mass of } <40\%)} \leq 3.5.$$

3. The composition according to claim 2, wherein the hydrous kaolin has a median particle size ranging from at least about 0.5 μm to about 2 μm.

4. The composition according to claim 2, wherein the hydrous kaolin has a shape factor of at least about 10.

5. The composition according to claim 1, wherein the total amount of alkali and alkaline earth metals present in the composition is less than or equal to about 0.5% by weight, relative to the total weight of the composition.

6. The composition according to claim 1, wherein the composition has an oil absorption of at least about 100%.

7. The composition according to claim 6, wherein the composition has an oil absorption of at least about 110%.

8. The composition according to claim 1, wherein the calcined kaolin comprises mullite.

9. The composition according to claim 8, wherein the mullite is present in the composition in an amount of at least about 2% by weight, relative to the total weight of the composition.

10. The composition according to claim 9, wherein the mullite is present in the composition in an amount of at least about 5% by weight, relative to the total weight of the composition.

11. The composition according to claim 10, wherein the mullite is present in the composition in an amount of at least about 8% by weight, relative to the total weight of the composition.

12. The composition according to claim 1, wherein the calcined kaolin comprises metakaolin.

13. A paint comprising the composition according to claim 1.

14. A polymer comprising the composition according to claim 1.

15. A cable sheathing comprising the composition according to claim 1.

16. A rubber comprising the composition according to claim 1.

17. A feed for a ceramic comprising the composition according to claim 1.

18. A composition for catalytic cracking according to claim 1.

19. A paper coating composition comprising a calcined kaolin according to claim 1.

20. A composition comprising calcined kaolin, the calcined kaolin having a particle size distribution wherein:

$$\frac{(\text{particle size at a cumulative mass of } <80\%)}{(\text{particle size at a cumulative mass of } <20\%)} \leq 3;$$

further wherein the total of alkali and alkaline earth metals present in the composition is less than or equal to about 0.6% by weight, relative to the total weight of the composition;

further wherein the calcined kaolin is formed from a hydrous kaolin; and the calcined kaolin being refined in the absence of a defining step.

* * * * *